United States Patent
Mohan et al.

(10) Patent No.: US 9,301,256 B2
(45) Date of Patent: Mar. 29, 2016

(54) LOW BATTERY INDICATION FOR CALLERS TO MOBILE DEVICE

(71) Applicant: Verizon Patent and Licensing Inc., Arlington, VA (US)

(72) Inventors: Prabhu V. Mohan, Chennai (IN); Ramya Sundarraman, Chennai (IN); Sridevi Rajendran, Chennai (IN); Vinod Krishnan Surianarayanan, Chennai (IN); Anand Chandrasekar, Chennai (IN); Vijay A. Senthil, Chennai (IN); Raja Sundaram Ganesan, Chennai (IN); Parthasarathi Kathiresan, Chennai (IN); Vijayan Radhakrishnan, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/339,631

(22) Filed: Jul. 24, 2014

(65) Prior Publication Data

US 2016/0029316 A1    Jan. 28, 2016

(51) Int. Cl.
*H04W 52/00* (2009.01)
*H04W 52/02* (2009.01)
*H04M 3/436* (2006.01)
*H04M 3/493* (2006.01)

(52) U.S. Cl.
CPC ........ *H04W 52/0229* (2013.01); *H04M 3/4365* (2013.01); *H04M 3/493* (2013.01); *H04W 52/0261* (2013.01)

(58) Field of Classification Search
None
See application file for complete search history.

(56) References Cited

U.S. PATENT DOCUMENTS

| | | | |
|---|---|---|---|
| 6,377,795 B1 * | 4/2002 | Bach et al. | 455/417 |
| 8,611,934 B2 * | 12/2013 | Kuulusa et al. | 455/466 |
| 8,958,854 B1 * | 2/2015 | Morley et al. | 455/574 |
| 2006/0121951 A1 * | 6/2006 | Perdomo et al. | 455/572 |
| 2006/0246881 A1 * | 11/2006 | Winkler et al. | 455/415 |
| 2008/0311961 A1 * | 12/2008 | Cotevino et al. | 455/574 |
| 2009/0098914 A1 * | 4/2009 | Martin-Cocher et al. | 455/572 |
| 2010/0273443 A1 * | 10/2010 | Forutanpour et al. | 455/404.1 |
| 2012/0131364 A1 * | 5/2012 | Gromat et al. | 713/320 |

* cited by examiner

*Primary Examiner* — Kimberly A Williams (57) ABSTRACT

A network device receives battery status signals for multiple mobile devices and receives a notification of an incoming call from a calling device to a particular mobile device. The network device determines if a battery status, from the battery status signals, is available for the particular mobile device and provides, to the calling device, a challenge to solicit a categorization of the incoming call as important or not important when a battery status is available for the particular mobile device. The network device receives, from the calling device, a response to the challenge, wherein the response includes the categorization of the incoming call. The network device connects the incoming call from the calling device to the particular mobile device when the categorization of the incoming call is important.

20 Claims, 9 Drawing Sheets

LOW BATTERY INDICATION FOR CALLERS TO MOBILE DEVICE

BACKGROUND

Mobile devices, such as smart phones and other electronic devices, typically rely on battery power, such as rechargeable batteries, for mobile operations. If battery power is nearly consumed and charging options are not immediately available, a mobile device user can typically limit or disable particular features of the mobile device to extend the battery life. As battery power for the mobile device becomes critically low, the user may seek to minimize all but the most important features and/or uses.

DETAILED DESCRIPTION OF PREFERRED EMBODIMENTS

The following detailed description refers to the accompanying drawings. The same reference numbers in different drawings may identify the same or similar elements.

When a mobile device has a low battery, a user may seek to minimize all but the most important features and/or uses of the mobile device to preserve battery life. Voice calls can consume a significant amount of battery resources for a mobile device. However, the relative importance of a voice call can be subjective and may not be discernable to a mobile device user until actually taking the call. Systems and methods provided herein may provide an indication, to a caller of a mobile device, that the mobile device user would prefer to receive only important calls to prevent consuming limited battery resources.

Figure 1:
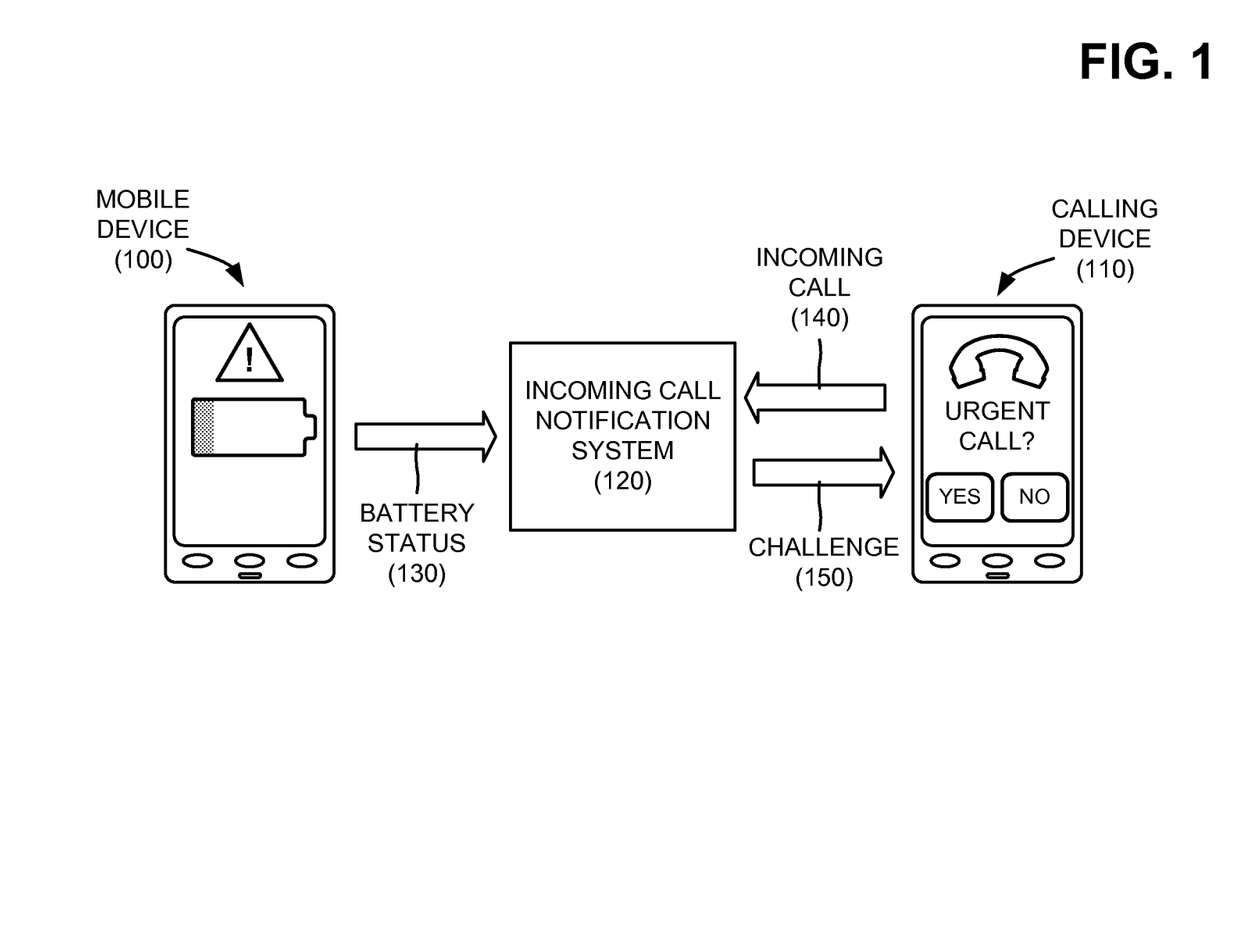
FIG. 1 is a diagram illustrating concepts described herein.

FIG. 1 is a diagram illustrating concepts described herein. As shown in FIG. 1, a calling device 110 may initiate a call to a mobile device 100. According to implementations described herein, an incoming call notification system 120 may manage a low-battery caller alert service to screen/limit inbound calls (e.g., voice calls) to mobile device 100 when a low battery condition exists for mobile device 100.

Mobile device 100 may execute a lightweight background application to monitor and provide a battery status 130 to incoming call notification system 120. Incoming call notification system 120 may be managed by a service provider within a communications network (not shown) or implemented on one or more of mobile device 100 and calling device 110. Assume, for example, that mobile device 100 has a low battery condition. Battery status 130, indicating a low battery level, may be provided to incoming call notification system 120. Based on battery status 130, incoming call notification system 120 may activate notifications for incoming calls to mobile device 100. Thus, when calling device 110 initiates an incoming call 140 to mobile device 100, incoming call notification system 120 may temporarily hold the call to provide a challenge 150 to calling device 150.

Challenge 150 may cause calling device 110 to indicate that mobile device 100 has a low battery and should only receive important calls. According to an implementation described herein, challenge 150 may prompt a user of calling device 110 to input a category of incoming call 140. Calling user input may be solicited via a user interface on calling device 110 (as shown in FIG. 1), an interactive voice response system, or another interface. The category of the incoming call may be selected, for example, based on a subjective determination by the calling user as "important" (e.g., the caller needs to speak with the user of mobile device 100 in spite of the low battery condition) or "not important" (e.g., the caller elects not to speak to the user of mobile device 100 given the low battery condition). In response to the calling user input, incoming call notification system 120 may either connect incoming call 140 (e.g., if identified as important) or redirect/disconnect incoming call 140 (e.g., if identified as not important). Thus, systems and methods described herein may preserve battery life of mobile device 100 by preventing connection of unnecessary incoming calls.

Figure 2:
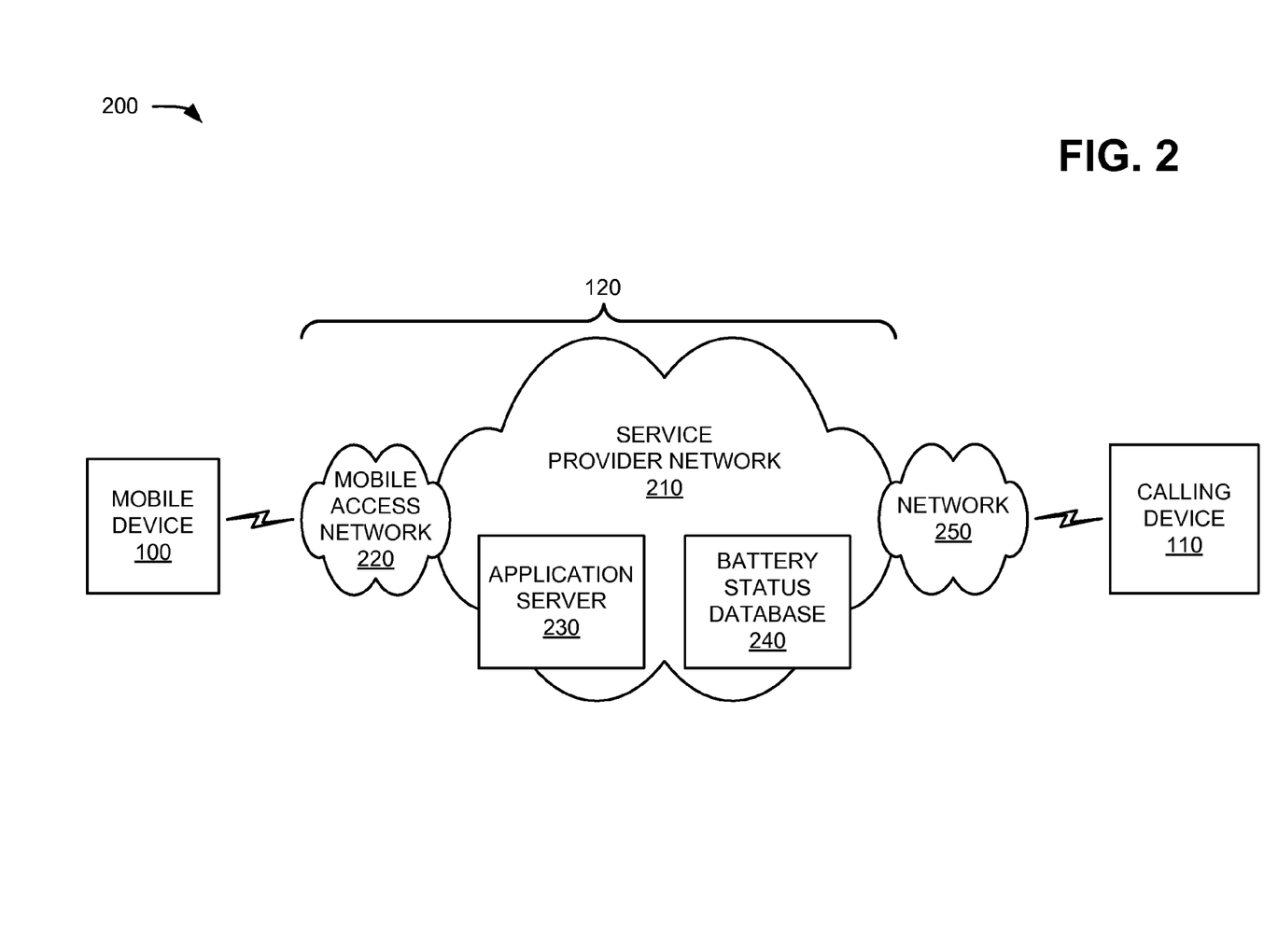
FIG. 2 is a diagram illustrating an exemplary network in which systems and/or methods described herein may be implemented.

FIG. 2 is a diagram illustrating an exemplary network environment 200 in which systems and methods described herein may be implemented. As illustrated, network environment 200 may include mobile device 100, calling device 120, a service provider network 210 to implement incoming call notification system 120, and a network 250. Service provider network 210 may include, for example, a mobile access network 220, an application server 230, and a battery status database 240. Components of network environment 200 may be connected via wired and/or wireless links.

Mobile device 100 may include a computational and/or communication device, such as a radiotelephone, a smart phone, a personal digital assistant (PDA) (e.g., that can include a radiotelephone, a pager, Internet/intranet access, etc.), a wireless device, a portable computer (e.g., a laptop or tablet computer), etc. Mobile device 100 may generally include a capability to receive incoming calls (e.g., voice and/or video calls) from other devices and a portable power supply (e.g., rechargeable or disposable batteries). In implementations described herein, user device 100 may be provided with an application to monitor and provide battery status to another component or system.

Calling device 110 may include device that is capable of initiating a voice and/or video call directed to mobile device 100. For example, user device 100 may include a computational and/or communication device, such as another mobile device 100, a wired telephone, a computer (e.g., a personal computer, a laptop computer, or a tablet computer), a global positioning system (GPS) device, a gaming device, etc. In one implementation described herein, calling device 110 may be provided with an application to receive battery status from another mobile device 100.

Service provider network 210 may include network devices that provide telecommunications services and provide a backend support system for facilitating incoming call notification system 120. Service provider network 210 may include, for example, one or more private Internet Protocol (IP) networks that use a private IP address space. Service provider network 210 may include a local area network (LAN), an intranet, a private wide area network (WAN), etc. In one implementation, service provider network 210 may implement one or more Virtual Private Networks (VPNs) for providing communication between devices within service provider network 210. Although shown as a single element in FIG. 2, service provider network 210 may include a number of separate networks. Service provider network 210 may permit mobile device 100 and/or calling device 110 to download a battery-saver agent (e.g., battery-saver agent application 500 described below) to enable collection, sending, and/or receiving of user device battery status.

According to an implementation, service provider network 210 may include mobile access network 220. Mobile access network 220 may include one or more resources (e.g., devices, components, etc.) that transfer/receive information (e.g., voice, data, broadband applications, etc.) to/from a circuit-switched and/or packet-switched network. As an example, mobile access network 220 may include a long-term evolution (LTE) network, a WiFi network (e.g., using IEEE 802.11 standards), or other access networks (e.g., an E-UTRAN, an enhanced high-rate packet data (eHRPD) network, or another 3G, 4G, or future wireless network standard). In one implementation, mobile access network 220 may include resources such as, for example, a radio network controller (RNC), a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices. In another implementation, mobile access network 220 may include other network elements, such as a policy and charging rule function (PCRF), a packet data network (PDN) gateway (PGW), and/or a home subscriber server (HSS).

Application server 230 may include one or more network devices or computing devices that generally facilitate notifications and call routing for incoming call notification system 120. Application server 230 may receive an opt-in or activation signal from a mobile device 100 to activate a low-battery caller alert service. Once the service is activated, application server 230 may receive and store battery status information from the particular mobile devices 110. Application server 230 may also receive (e.g., from mobile access network 220) indications of an incoming call to mobile devices 100. Application server 230 may provide low-battery notifications to calling device 110 and direct routing of the incoming call based on user input from calling device 110. In other implementations, application server 230 may be included as a distributed component and/or integrated within another device of service provider network 210 and/or mobile access network 220.

Battery status database 240 may include a memory, database, or another data structure to store data that application server 230 receives from mobile device 100. In one implementation, battery status database 240 may store activation indications for the low-battery caller alert service and battery status associated with particular mobile devices. Additionally, battery status database 240 may store an event log of calls that were accepted or dropped during the service. In one implementation, battery status database 240 may be a distributed component.

Network 250 may include one or more networks including another wireless network, a satellite network, the Internet, a telephone network, such as the Public Switched Telephone Network (PSTN), a metropolitan area network (MAN), a wide area network (WAN), a local area network (LAN), a mesh network, a fiber-optics network (e.g., passive optical networks (PONS)), an ad hoc network, or another type of network. In an exemplary implementation, network 250 may include a combination of networks and other components (e.g., switches, routers, etc.) for transmitting data to and from service provider network 210.

In FIG. 2, the particular arrangement and number of components of network environment 200 are illustrated for simplicity. In practice there may be more or fewer mobile devices 100, calling devices 110, service provider networks 210, mobile access networks 220, application servers 230, databases 240, or networks 250. For example, there may be thousands of user devices 100 and/or calling devices 110. In another example, one or more of mobile access network 220 or network 250 may be excluded.

Figure 3:
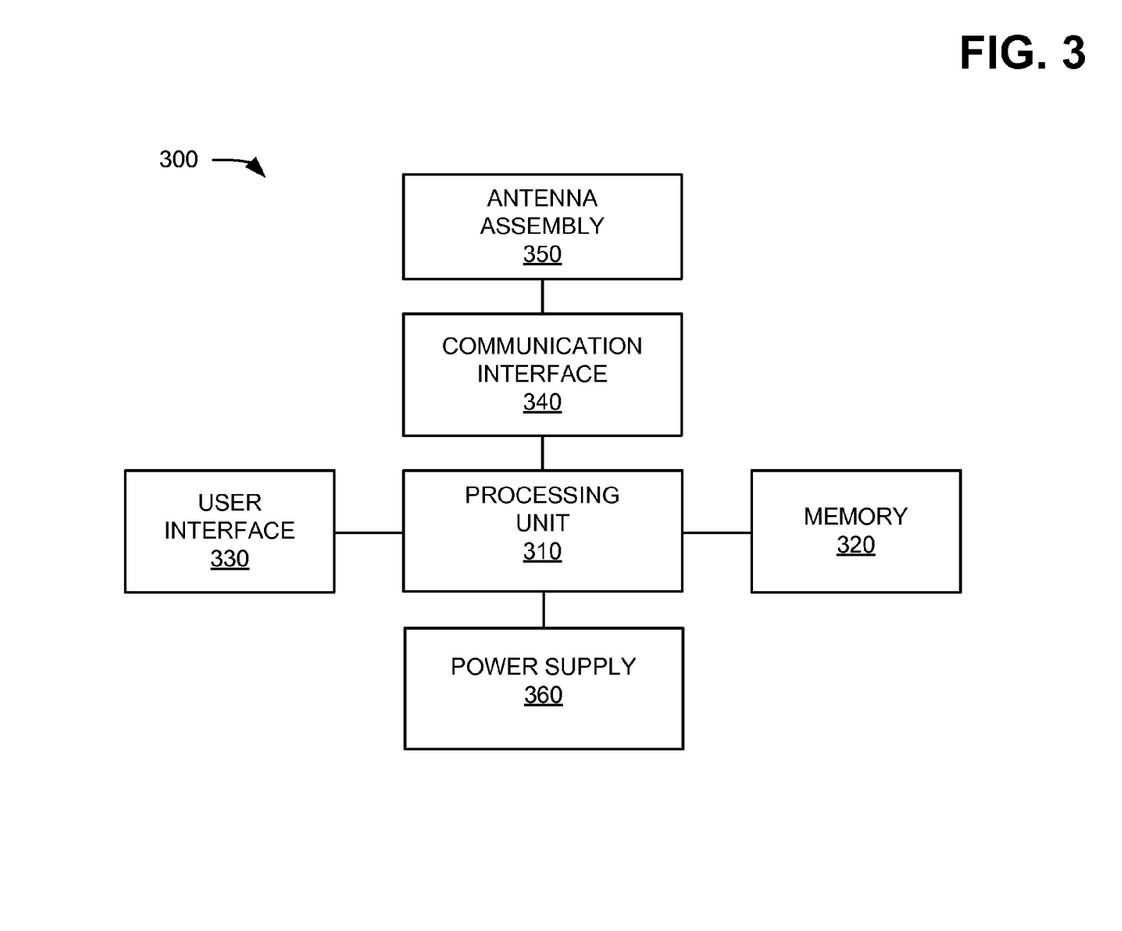
FIG. 3 is a block diagram illustrating exemplary components of a device that may correspond to a mobile device or calling device of FIG. 2.

FIG. 3 is a diagram illustrating exemplary components of a device 300, according to an implementation described herein. Each of mobile device 100 or calling device 110 may be implemented/installed as a combination of hardware and software on one or more of device 300. As shown in FIG. 3, device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of device 300 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to device 300 and/or to output information from device 300. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as a liquid crystal display (LCD), to output visual information; an actuator to cause device 300 to vibrate; a sensor; and/or any other type of input or output device.

Communication interface 340 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a NFC wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals via an antenna and receive RF signals from an antenna and provide them to communication interface 340.

Power supply 360 may include one or more batteries or other portable power source components used to supply power to components of device 300. Power supply 360 may also include control logic to control application of power from an external power source (e.g., a charger) to one or more components of device 300.

As described herein, device 300 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows example components of device 300, in other implementations, device 300 may include fewer components, different components, differently-arranged components, or additional components than those depicted in FIG. 3. Additionally or alternatively, one or more components of device 300 may perform the tasks described as being performed by one or more other components of device 300.

Figure 4:
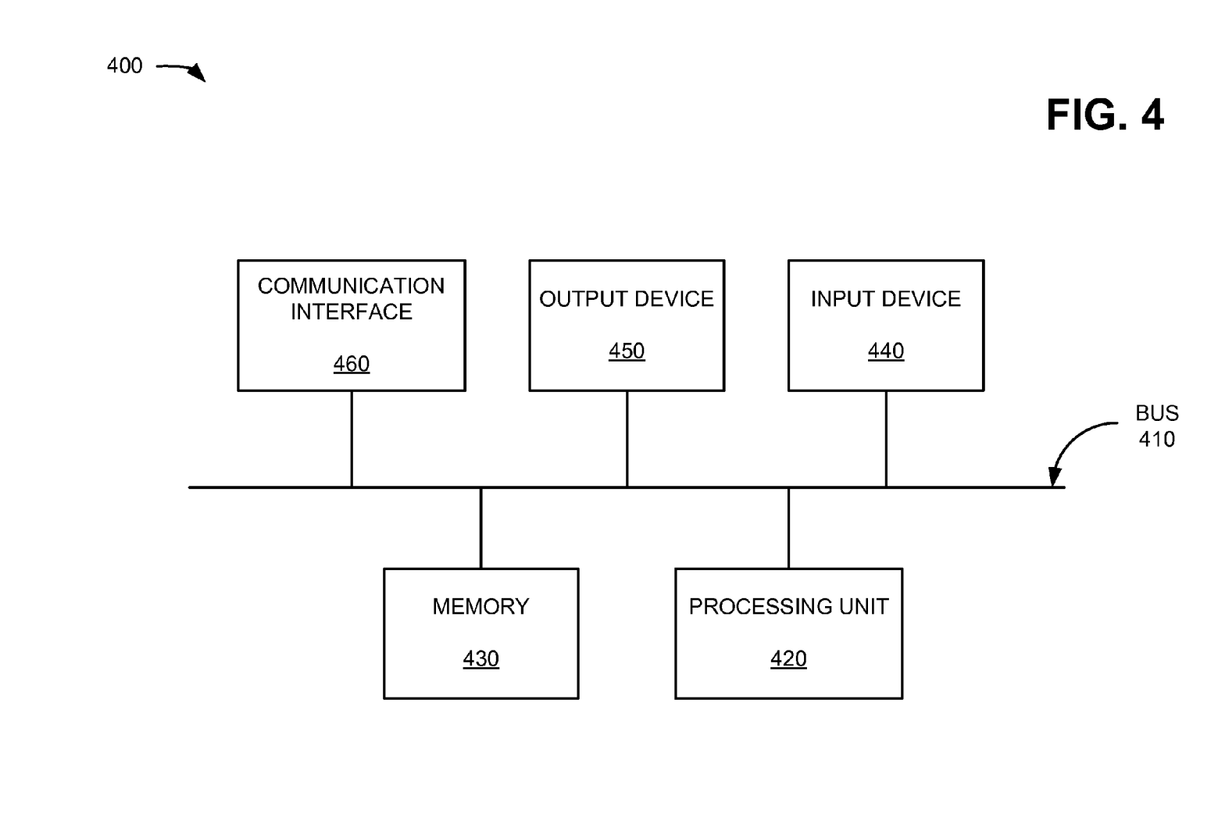
FIG. 4 is a block diagram illustrating exemplary components of a device that may correspond to one or more of the devices of FIG. 2.

FIG. 4 is a diagram illustrating exemplary components of a device 400. Each of calling device 110, application server 230, and/or some devices in mobile accesses network 220 may be implemented/installed as a combination of hardware and software on one or more of device 400. As shown in FIG. 4, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits a user to input information to device 400, such as a keyboard, a keypad, a mouse, a pen, a microphone, one or more biometric mechanisms, and the like. Output device 450 may include a device that outputs information to the user, such as a display, a speaker, etc.

Communication interface 460 may include any transceiver-like mechanism that enables device 400 to communicate with other devices and/or systems. For example, communication interface 460 may include mechanisms for communicating with other devices, such as other devices of network environment 200.

As described herein, device 400 may perform certain operations in response to processing unit 420 executing software instructions stored in a computer-readable medium, such as memory 430. The software instructions may be read into memory 430 from another computer-readable medium or read into memory 430 from another device via communication interface 460. The software instructions stored in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently-arranged components, or additional components than those depicted in FIG. 4. As an example, in some implementations, a display may not be included in device 400. In these situations, device 400 may be a "headless" device that does not include input device 440. Alternatively, or additionally, one or more components of device 400 may perform one or more other tasks described as being performed by one or more other components of device 400.

Figure 5:
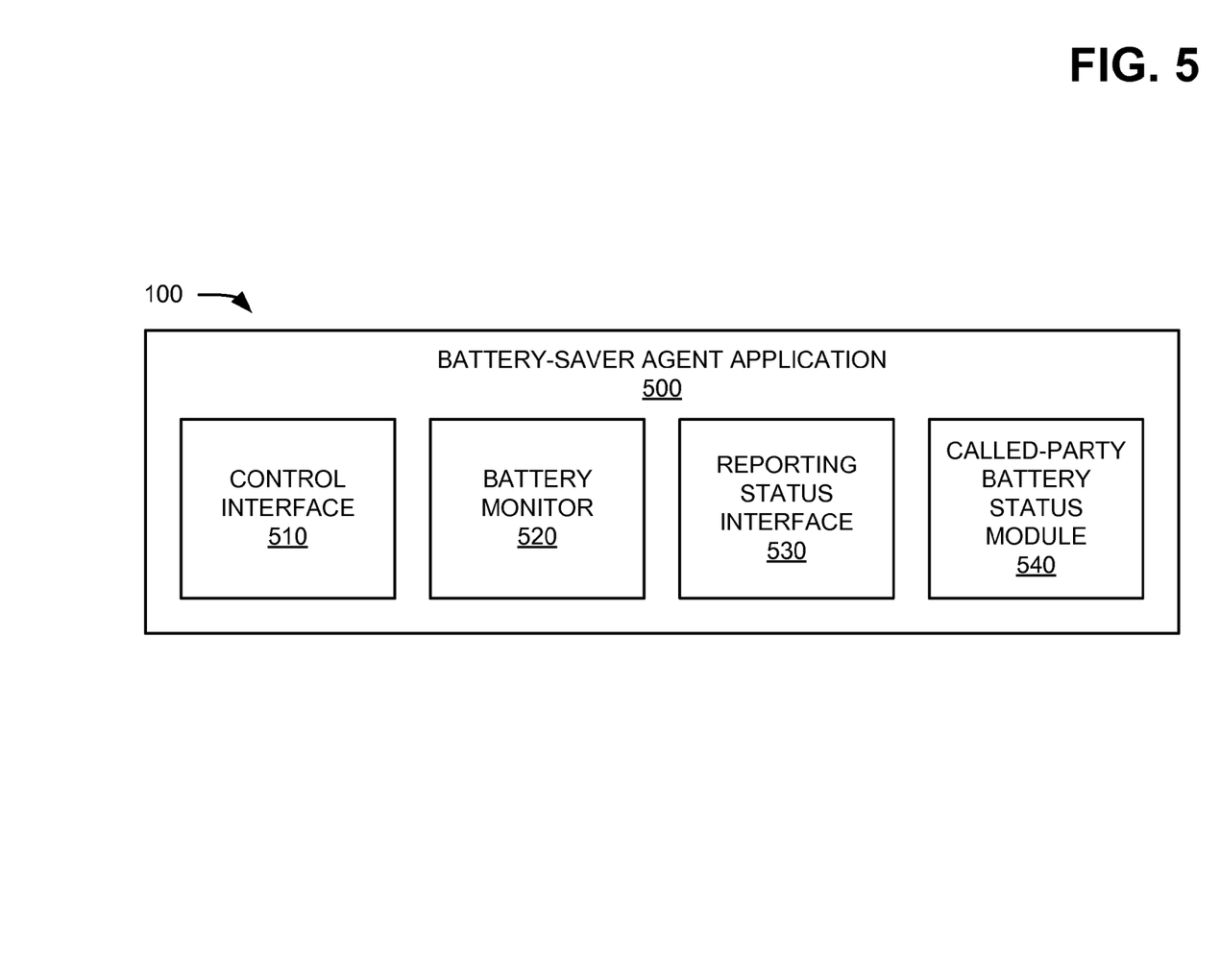
FIG. 5 is a block diagram illustrating exemplary functional components of the mobile device of FIG. 2.

FIG. 5 is a block diagram illustrating an exemplary functional component of mobile device 100. The functional components of FIG. 5 may be implemented, for example, by processing unit 310 in conjunction with memory 320. As shown in FIG. 5, mobile device 100 may include a battery-saver agent application 500 that includes a control interface 510, battery monitor 520, reporting status interface 530, and called-party battery status module 540.

Battery-saver agent application 500 may generally include a lightweight background application to monitor and provide a battery status signal to application server 230 and/or calling device 110. In one implementation, application server 230 may screen calls based on information from battery-saver agent application 500. In another implementation, battery-saver agent application 500 may temporarily hold/screen incoming calls to allow background processes to identify the subjective category of an incoming call prior to notifying a user of a call. In one implementation, battery-saver agent application 500 may be included as part of an operating system (OS) or OS upgrade for mobile device 100. In another implementation, battery-saver agent application 500 may be includes as a separate application.

Control interface 510 may provide a user interface to activate the low-battery caller alert service for mobile device 100. For example, control interface 510 may include a user interface to solicit a user to opt-in or activate battery-saver agent application 500. Upon receiving the activation authorization and/or preferences, control interface 510 may provide one or more mobile numbers (e.g., a mobile directly number or MDN) associated with mobile device 100 to application server 230. In one implementation, control interface 510 may allow a user to set an activation threshold for a low-battery condition. For example, battery-saver agent application 500 may provide a default threshold of 10% to trigger a low-battery indication, and control interface 510 may allow a user to select a different activation threshold (e.g., 5%, 15%, 25%, etc.). In another implementation, control interface 510 may use different types of thresholds, such as a time-based threshold related to communications (e.g., 5 minutes of talk time) or other applications (10 minutes of video presentation, 15 minutes of monitoring, 10 minutes at current power-consumption rates, etc.) of mobile device 100.

Battery monitory 520 may identity current battery conditions of mobile device 100. In one implementation, battery monitor 520 may communicate with other operating system components to identify an available capacity of power source 360. In another implementation, battery monitor 520 may convert battery capacity information in to another format, such as a time-based value, for comparison against a particular threshold (e.g., as defined with control interface 510). In one implementation, battery monitor 520, may employ two or more thresholds to minimize vacillating low-battery indications. For example, based on a single activation setting (e.g., 10% as set by a user or a default threshold setting) battery monitor may identify an almost satisfactory threshold (e.g., 8%) and almost low threshold (e.g. 12%) with a hysteresis region in between the two thresholds.

Reporting status interface 530 may communicate battery conditions for mobile device 100 to incoming call notification system 120 (e.g., application server 230) or to calling device 110. For example, reporting status interface 530 may receive battery conditions from battery monitor 520 that indicate the battery capacity has dropped below an activation threshold for the low-battery caller alert service. In one implementation, reporting status interface 530, in response to the reported battery conditions, may send a signal to application server 230 that a low-battery condition exists or that a low-battery condition no longer exists. Additionally, or alternatively, reporting status interface 530 may send a battery condition signal to calling device 110 (e.g., executing another copy of battery-saver agent application 500).

In some implementations, called-party battery status module 540 may manage handing of outgoing calls from calling device 110 to other mobile devices 100. For example, battery status information for a contact (e.g., from reporting status interface 530 of another mobile device 100) may be stored locally by called-party battery status module 540. As another example, called-party battery status module 540 may receive a signal (e.g., a short messaging service (SMS) message, a session initiation protocol (SIP) message, or another type of message) to indicate a low-battery condition of a called mobile device 100 when a call is placed to mobile device 100. Called-party battery status module 540 also may provide a user interface to notify a caller in response to a low-battery indication from either mobile device 100 and/or application server 230 when a call is placed to mobile device 100.

Thus, in one implementation, application server 230 and/or calling device 110 may be made aware of a battery condition of mobile device 100 before an incoming call is initiated to mobile device 100. In another implementation, calling device 110 may be made aware of a low battery condition of mobile device 100 in response to placing a call to mobile device 100.

Figure 6:
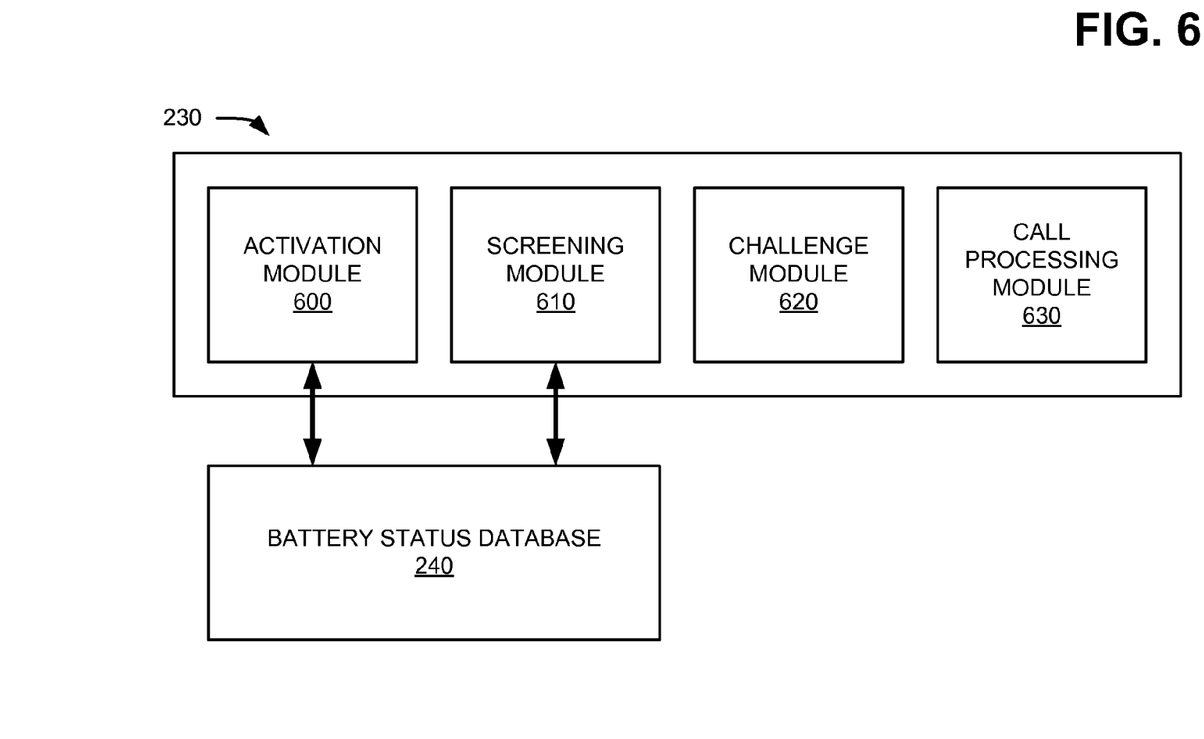
FIG. 6 is a block diagram illustrating exemplary functional components of an application server of FIG. 2.

FIG. 6 is a block diagram illustrating exemplary functional components of application server 230 for incoming call notification system 120. The functional components of FIG. 6 may be implemented by, for example, processing unit 420 in conjunction with memory 430. As shown in FIG. 6, application server 230 may include an activation module 600, a screening module 610, a challenge module 620, and a call processing module 630 to provide a low-battery caller alert service.

Activation module 600 may solicit and accept activation or "opt-in" signals from mobile device 100 (e.g., via control interface 510). Activation module 600 may store indications (e.g., flags, markers, inclusion of MDN, etc.) in battery status database 230 that mobile device 100 is participating in the low-battery caller alert service. In one implementation, when any incoming call to a mobile device number (e.g., from calling device) is serviced by service provider network 210, activation module 600 may perform a lookup to determine if the call is directed to a mobile device (e.g., mobile device 100) that is participating in the low-battery caller alert service. If a call from calling device 110 is not directed to a mobile device that is participating in the low-battery caller alert service, activation module 600 may simply pass the call through (or direct call processing module 630 to pass the call through). If the call from calling device 110 is directed to mobile device 100 that is participating in the low-battery caller alert service, activation module 600 may initiate a lookup by screening module 610.

Screening module 610 may receive battery status signals from mobile device 100 (e.g., via reporting status interface 530). Screening module 610 may store battery status indications (e.g., "low" or "satisfactory") associated with a particular mobile device (an MDN or another unique identifier), in battery status database 230. In one implementation, when an incoming call (e.g., an incoming call to mobile device 100 that activation module 600 identifies as participating in the low-battery caller alert service) is indicated, screening module 610 may perform a lookup (e.g., in battery status database) of the battery status for the particular mobile device. If the call from calling device 110 is directed to mobile device 100 with a "satisfactory" (not low) battery indication, screening module 610 may simply pass the call through (or direct call processing module 630 to pass the call through). If the call from calling device 110 is directed to mobile device 100 with a "low" battery indication, screening module 610 may initiate challenge process by challenge module 620.

Challenge module 620 may receive an indication (e.g., from screening module 610) that a call is being attempted from calling device 110 to a mobile device 100 that has a low battery (e.g., below a default or user-selected threshold). In response to this indication, challenge module 620 may provide a notification to calling device 110 to inform the user that the user of mobile device 100 should only receive important calls. A response from calling device 110 may be required before further processing of the call. For example, if the response from calling device 110 indicates the call is important, challenge module 620 may pass the call through (or direct call processing module 630 to pass the call through) to mobile device 100. If the response from calling device 110 indicates the call is not important, challenge module 620 may initiate a redirect process by call processing module 630. In one implementation, if the response from calling device 110 indicates the call is not important, challenge module 620 may provide an additional inquiry to determine a caller's preference if the call is not connected. For example, challenge module 620 may inquire whether the caller prefers to leave a voicemail message, log the call attempt, or disconnect.

In one implementation, challenge module 620 may include (or be included within) an interactive voice response (IVR) system that allows a user of calling device 110 to select an option from a voice menu or otherwise interface with challenge module 620. Challenge module 620 may, for example, play pre-recorded voice prompts to which the user of calling device 110 may respond by either pressing a number on a telephone keypad or by speaking a response. In one implementation, challenge module 620 may playback an announcement stating the user of mobile device 100 is only able to receive urgent/important calls and prompting calling device 110 to provide user input categorizing the nature of the call (e.g., as either important or not important).

In another implementation, challenge module 620 may provide a message (e.g., an SMS message, or a caller ID indication, or another type of message) to calling device 110 in response to receiving an indication that a call is being attempted to a mobile device 100 that has a low battery. The message may require a response from a user of calling device 110 to categorizing the nature of the call (e.g., as either important or not important) before challenge module 620 allows the call to be connected or redirected.

Call processing module 630 may receive call processing instructions from activation module 600, screening module 610, and/or challenge module 620. In one implementation, call processing module 630 may receive instructions from any of activation module 600, screening module 610, and/or challenge module 620 to connect a call (e.g., based on a determination that an inbound call for mobile device 100 is not subject to screening, is not directed to a device with low battery power, or is designated important). In another implementation, call processing module 630 may receive instructions from challenge module 620 to block a call or re-direct an inbound call directly to a voicemail system (e.g., based on a determination that an inbound call for mobile device 100 is directed to a device with low battery power and is designated as not important). In one implementation, call processing module 630 may be integrated or in communication with a voicemail system that services mobile device 100. Additionally, or alternatively, call processing module 630 may log (e.g., in battery status database 240 or another memory location) call attempts that are subject to screening by the low-battery caller alert service.

Figure 7:
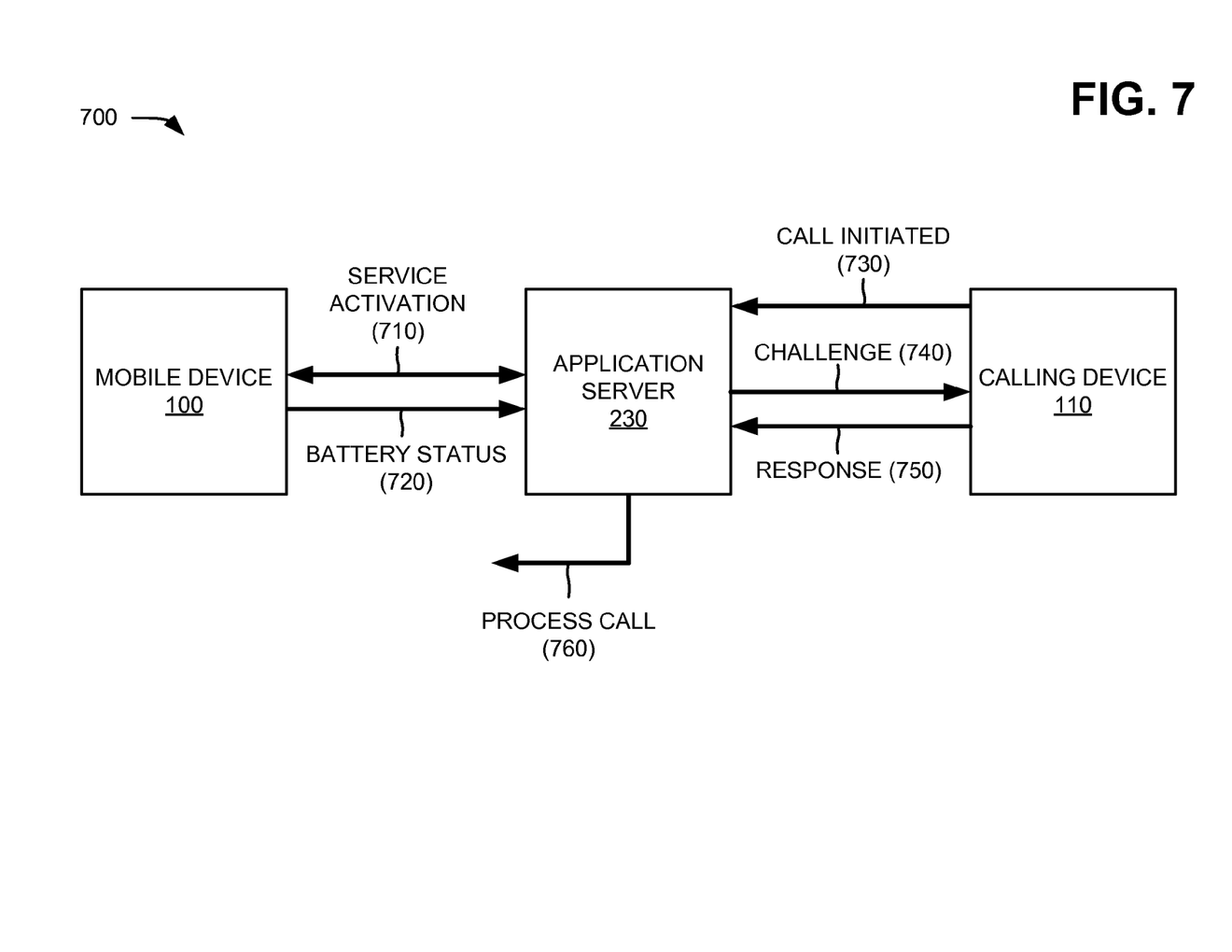
FIG. 7 is a diagram illustrating exemplary communications in a portion of the network of FIG. 2.

FIG. 7 is a diagram of exemplary communications among devices in a portion 700 of network environment 200. Communications in FIG. 7 may represent communications for implementing a low-battery caller alert service with one or more backend server devices, such as application server 230. As shown in FIG. 7, network portion 700 may include mobile device 100, calling device 110, and application server 230. Mobile device 100, calling device 110, and application server 230 may include features described above in connection with, for example, FIGS. 1-6.

As shown in FIG. 7, mobile device 100 (e.g., via control interface 510 of battery-saver agent application 500) may communicate with application server 230 (e.g., activation module 600) to activate 710 the low-battery caller alert service, authorizing application server 230 to collect battery status information from mobile device 100 and solicit a calling category (e.g., important or not important) from incoming calling devices when battery status information from mobile device 100 indicates low battery levels. Once activated, mobile device 100 (e.g., reporting status interface 530) may provide a battery status 720 to application server 230. Battery status 720 may include, for example, an indication that a battery for mobile device 100 is either low (e.g., below a threshold capacity) or sufficient (e.g., above a threshold capacity). Application server 230 (e.g., screening module 610) may store battery status 720 locally or in a database associated with a unique identifier (e.g., an MDN) for mobile device 100.

As further shown in FIG. 7, calling device 110 may initiate a call 730 to mobile device 100. Application server 230 may inspect call information and may determine that call 730 is either allowed to connect or should be otherwise directed (e.g., directed to a voicemail system). Assuming battery status 720 for mobile device 100 indicates a low-battery condition, application server 230 (e.g., screening module 610) may determine that call 730 is subject to screening and may screen the call to determine that call 730 is directed to a device with low battery power.

Upon determining that call 730 is directed to a device with low battery power, application server 230 (e.g., challenge module 620) may provide a challenge 740 to solicit, from the user of calling device 110, a categorization of call 730. For example, through either an IVR prompt or a separate text-based message (e.g., an SMS message), application server 230 may indicate a low battery condition for mobile device 100 and request the user of calling device to categorize call 730 as important (e.g., urgent or time-sensitive) or not important. According to implementations described herein, the categorization of call 730 is a subjective decision of the user of calling device 110, thus preventing mischaracterization of a call via automated processes. Application server 230 may hold call 730 until calling device 110 provides a response 750. Response 750 may include, for example, an IRV input or responsive SMS message that categorizes call 730 either as important or not important.

Based on response 750, application server 230 (e.g., call processing module 630) may process 760 the call from calling device 110. For example, if response 750 indicates call 730 is "important," process 760 by application server 230 may include placing the call through to mobile device 100. Conversely, if response 750 indicates call 730 is "not important," process 760 by application server 230 may direct the call to a voicemail system for mobile device 100.

Figure 8:
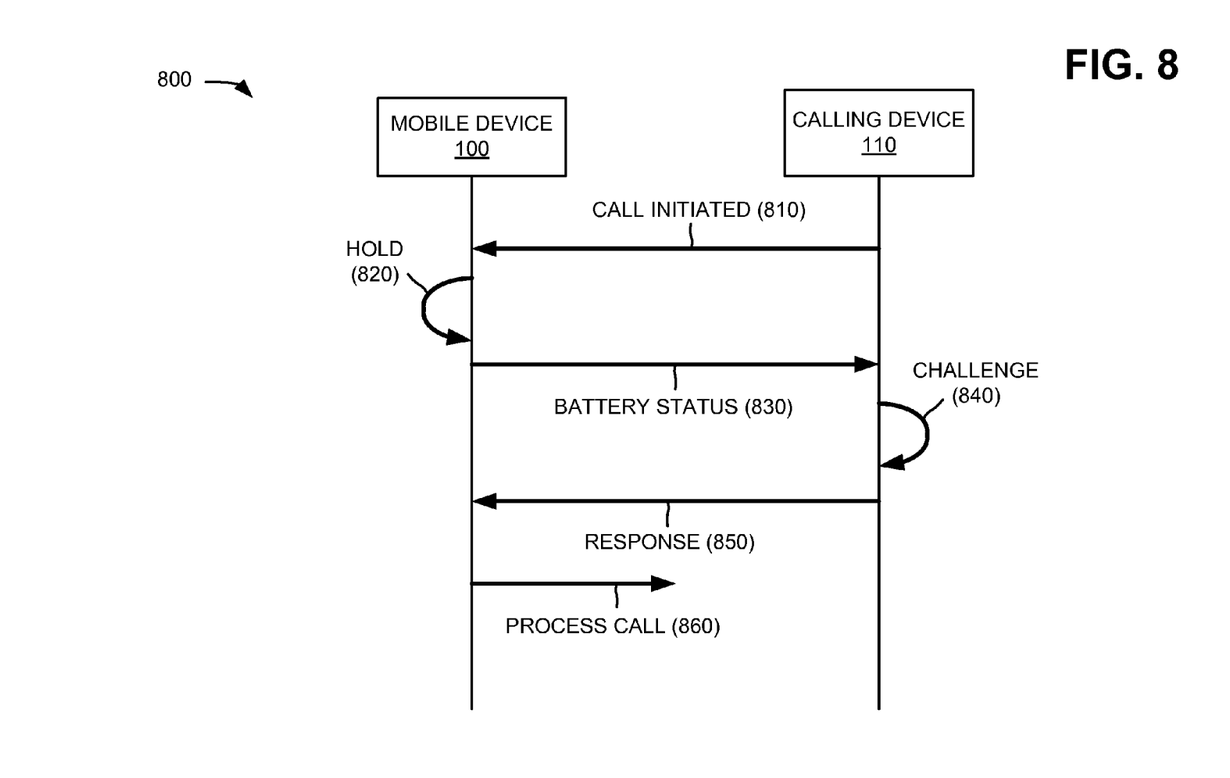
FIG. 8 is a diagram illustrating exemplary communications between a calling device and a mobile device in the network of FIG. 2.

FIG. 8 is a diagram of exemplary communications between a calling device 110 and a mobile device 100 in of network environment 200. Communications in FIG. 8 may represent communications for implementing a low-battery caller alert service between two mobiles devices, such as mobile device 100 and calling device 110, without dedicated network components for incoming call notification system 120. As shown in FIG. 8, network portion 800 may include mobile device 100 and calling device 110. Mobile device 100 and calling device 110 may include features described above in connection with, for example, FIGS. 1-7.

As shown in FIG. 8, calling device 110 may initiate a call 810 to mobile device 100 that has a low battery condition. Mobile device 100 (e.g., battery-saver agent application 500) may temporarily hold 820 the call and provide a battery status indication 830 to calling device 110. Battery status indication 830 may include, for example, a text-based message, such as an SMS message, instant message, or another type of message, with an indication that a battery for mobile device 100 is low (e.g., below a threshold capacity). In response to receiving battery status indication 830, calling device (e.g., called-party battery status module 540) may provide a challenge 840 to solicit, from the user of calling device 110, a categorization of call 810. For example, calling device 110 may request the user of calling device 110 to provide a subjective categorization of call 810 as important or not important. User input for calling device 110 may be provide, for example, via an on-screen selection or audible input.

Based on a response to challenge 840 with an "important" categorization, calling device 110 may provide a response 850 to mobile device 100 indicating the call is important. In which case, mobile device 100 (e.g., battery-saver agent application 500) may process 860 the call to accept the call (e.g., notify the user of the incoming call). Alternatively, based on a response to challenge 840 with a "not important" categorization, calling device 110 may provide a response 850 to mobile device 100 indicating the call is not important. In this case, mobile device 100 may process 860 the call to reject the call (e.g., block the call or direct the call to a voicemail system). In another implementation, a user of calling device 110 may simply terminate call 810 upon receiving challenge 840.

Figure 9:
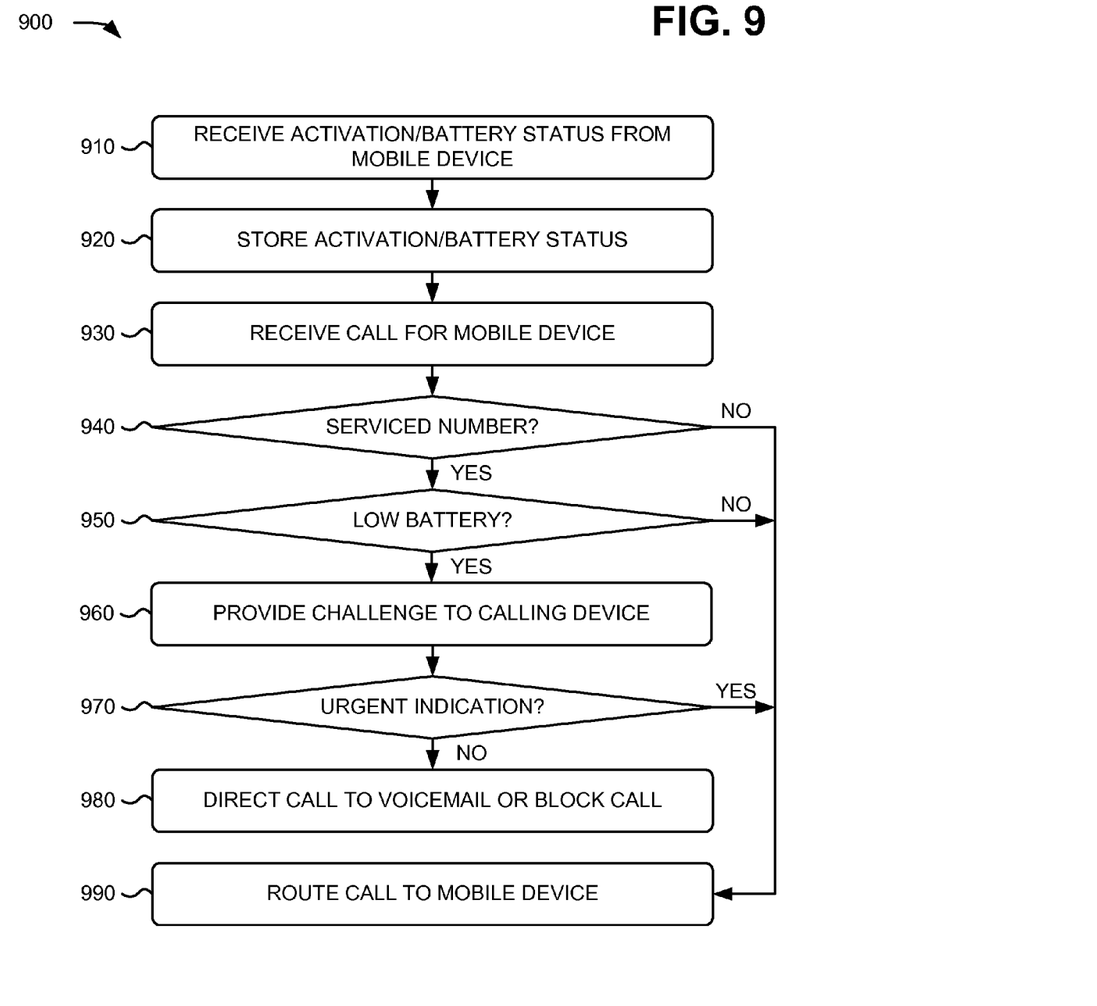
FIG. 9 is a flow diagram illustrating an exemplary process for implementing a low-battery caller alert service, according to an implementation described herein.

FIG. 9 is a flow diagram illustrating an exemplary process 900 for implementing a low-battery caller alert service according to an implementation described herein. In one implementation, process 900 may be performed by application server 230. In another implementation, some or all of process 900 may be performed by another device or group of devices, including or excluding application server 230. For example, in one implementation, mobile device 100 and/or calling device 110 may perform one or more parts of process 900. In another implementation, other devices within incoming call notification system 120 may perform one or more parts of process 900.

As shown in FIG. 9, process 900 may include receiving activation and/or battery status from the mobile device (block 910), and storing the activation and/or battery status (block 920). For example, permit mobile device 100 may download battery-saver agent application 500 to enable collection of battery status information. Application server 230 (e.g., activation module 600) may solicit and/or accept activation or "opt-in" signals from mobile device 100, executing battery-saver agent application 500, to activate the low-battery caller alert service. Application server 230 (e.g., screening module 610) may then receive battery status signals from mobile device 100. Application server 230 may store activation and battery status indications, associated with the particular mobile device 100, in battery status database 240.

Process 900 may also include receiving a call for the mobile device (block 930), and determining if the call is directed to a number participating in the low-battery caller alert service (block 940). For example, application server 230 (e.g., activation module 600) may receive an indication of an incoming call from calling device 110 and may perform a lookup in battery status database 240 to determine if the incoming call is directed to a mobile device (e.g., mobile device 100) that is participating in the low-battery caller alert service.

If the call is for a number participating in the low-battery caller alert service block 940—YES, process 900 may include determining if the called number is associated with a low-battery indication (block 950). For example, if activation module 600 identifies that the incoming call is directed to mobile device 100, application server 230 (e.g., screening module 610) may perform a lookup in battery status database 240 to determine if the called device (e.g., mobile device 100) has a low-battery indication.

If the called number is associated with a low-battery indication (block 950—YES), process 900 may include providing a challenge to the calling device (block 960), and determining if a response to the challenge indicates an urgent call (block 970). For example, if screening module 610 determine that mobile device 100 has a low-battery indication, application server 230 (e.g., challenge module 620) provide a notification to calling device 110 to inform the user of calling device 110 that the user of mobile device 100 should only receive important calls. Application server 230 may require a response (e.g., indicating a subjective categorization of either "important" or "not important") from calling device 110 before further processing of the call.

If the response to the challenge does not indicate an urgent call (block 970—NO), process 900 may include directing the call to a voicemail system or blocking the call (block 980). For example, if the response from calling device 110 indicates the call is not important, challenge module 620 may initiate a redirect process to route the call to a voicemail system or to block the call from calling device 110.

If the call is not for a number participating in the low-battery caller alert service (block 940—NO), or if the called number is not associated with a low-battery indication (block 950—NO), or if the response to the challenge indicates an urgent call (block 970—YES), process 900 may include routing the call to the mobile device (block 990). For example, Application server 230 may connect the call from calling device 110 based on a determination that an inbound call for mobile device 100 is not subject to screening, is not directed to a device with low battery power, or is designated important.

According to implementations described herein, a network device may receive battery status signals for multiple mobile devices and a notification of an incoming call from a calling device to a particular mobile device. The network device may determine if a battery status, from the battery status signals, is available for the particular mobile device and may provide, to the calling device, a challenge to solicit a categorization of the incoming call as important or not important when a battery status is available for the particular mobile device. The network device may receive, from the calling device, a response to the challenge that includes the categorization of the incoming call. The network device may connect the incoming call from the calling device to the particular mobile device when the categorization of the incoming call is important.

Systems and methods described herein may provide an indication, to a caller of a mobile device, that the mobile device user would prefer to receive only important calls to prevent wasting low battery resources. In one implementation, the categorization of a call is a subjective decision of the user of calling device 110 to prevent automated mischaracterization of a call.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code--it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   sending, by a first mobile device and to a network device, a battery status signal indicating a low battery level;
   sending, by the first mobile device and to a second mobile device, the battery status signal indicating the low battery level;
   receiving, by the network device, the battery status signal;
   storing, by the network device, the battery status signal associated with a unique identifier for the first mobile device;
   receiving, by the network device, a notification of an incoming call from a calling device to the first mobile device;
   determining, by the network device, if the low battery level, from the battery status signal, is stored for the first mobile device;
   providing, by the network device and to the calling device, a challenge to solicit a categorization of the incoming call as important or not important, when the low battery level is stored for the first mobile device;
   receiving, by the network device and from the calling device, a response to the challenge, wherein the response includes the categorization of the incoming call; and
   connecting, by the network device, the incoming call from the calling device to the first mobile device when the categorization of the incoming call is important.

2. The method of claim 1, further comprising:
   redirecting, by the network device, the incoming call to a voicemail system associated with the first mobile device when the categorization of the incoming call is not important.

3. The method of claim 1, further comprising:
   receiving, by the network device, an activation signal for implementing a low-battery caller alert service for a mobile device; and
   determining, by the network device and in response to receiving the notification of the incoming call, if the first mobile device is participating in the low-battery caller alert service.

4. The method of claim 1, wherein the first mobile device and the second mobile device each include a battery-saver agent application that manages handling of outgoing calls.

5. The method of claim 1, further comprising:
   sending, by the first mobile device and to the network device, another battery status indicating a satisfactory battery level; and
   sending, by the first mobile device and to the second mobile device, the other battery status indicating the satisfactory battery level.

6. The method of claim 5, wherein the battery status signal and the other battery status signal each correspond to a threshold capacity for a battery of the first mobile device.

7. The method of claim 6, wherein the threshold capacity is configurable by a user of the first mobile device.

8. The method of claim 1, wherein the categorization of the incoming call is selected based on a subjective input from a user of the calling device.

9. The method of claim 1, wherein providing the challenge further comprises:
   providing a query via an interactive voice response system.

10. The method of claim 1, wherein providing the challenge further comprises:
    holding the incoming call, and
    sending a query to the calling device via a text-based message.

11. The method of claim 1, wherein a user of the second mobile device is stored as a contact on the first mobile device.

12. A mobile device, comprising:
    a network interface to communicate with one or more remote systems;
    a battery;
    one or more memories to store instructions; and
    one or more processors configured to execute instructions in the one or more memories to:
       determine that a low-battery condition exists;
       send, to a second mobile device, a battery status signal indicating the low-battery condition;
       receive a notification of an incoming call from a calling device to the mobile device;
       provide, to the calling device, a challenge to solicit a categorization of the incoming call as important or not important;
       receive, from the calling device, a response to the challenge, wherein the response includes the categorization of the incoming call; and
       accept the incoming call from the calling device to the mobile device when the categorization of the incoming call is important.

13. The mobile device of claim 12, wherein the one or more processors are further configured to execute instructions in the one or more memories to:
    redirect the incoming call to a voicemail system associated with the mobile device when the categorization of the incoming call is not important.

14. The mobile device of claim 12, wherein the one or more processors are further configured to execute instructions in the one or more memories to:
    receive an activation signal for implementing a battery-saver agent application for the mobile device.

15. The mobile device of claim 14, wherein the battery-saver agent application manages handing of outgoing calls from the mobile device.

16. The mobile device of claim 12, wherein, when providing the challenge, the one or more processors are further configured to execute instructions in the one or more memories to:
    hold the incoming call until the receiving of the response to the challenge.

17. The mobile device of claim 12, wherein, when providing the challenge, the one or more processors are further configured to execute instructions in the one or more memories to:
    send a query to the calling device via a text-based message.

18. A calling device, comprising:
    a network interface to communicate with one or more remote systems;
    a battery;
    one or more memories to store instructions; and
    one or more processors configured to execute instructions in the one or more memories to:
       store, in the memory, a battery-saver agent application;
       receive, from a mobile device of a contact that is associated with the battery-saver agent application, battery status information of the mobile device;
       store the battery status information from the mobile device;
       receive, from a user, an input to select the contact corresponding to the mobile device;

determine a low-battery indication for the mobile device based on the battery status information when the contact corresponding to the mobile device is selected; and notify the user, based on the battery status information and in response to the input, of the low-battery indication for the mobile device.

19. The calling device of claim 18, wherein the one or more processors are further configured to execute instructions in the one or more memories to:

initiate a call from the calling device the mobile device;

receive, from the mobile device, a low-battery indication;

present, to a user, a challenge to solicit a categorization of the call as important or not important; and provide, to the mobile device, a response to the challenge, wherein the response includes the categorization of the call.

20. The calling device of claim 18, wherein the categorization of the call includes a designation selected from a group including important and not important.

* * * * *